United States Patent Office 3,629,259
Patented Dec. 21, 1971

---

3,629,259
CYANOALKYLAMINOTRIAZINES
Werner Schwarze, Frankfurt am Main, Germany, assignor to Deutsche Gold- und Silber-Scheideanstalt vormals Roessler, Frankfurt am Main, Germany
No Drawing. Continuation-in-part of application Ser. No. 652,036, July 10, 1967. This application Mar. 5, 1969, Ser. No. 804,718
Claims priority, application Germany, July 16, 1966, D 50,605; Nov. 22, 1966, P 16 70 541.2; Mar. 7, 1968, P 16 70 594.5
The portion of the term of the patent subsequent to Apr. 7, 1987, has been disclaimed
Int. Cl. C07d 55/20, 55/22
U.S. Cl. 260—249.8
26 Claims

ABSTRACT OF THE DISCLOSURE

A substituted s-triazine of the formula:

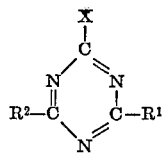

wherein X is halogen, alkoxy, or alkylmercapto, alkyl in alkoxy and alkylmercapto having 1 to 6 carbon atoms; $R^1$ is

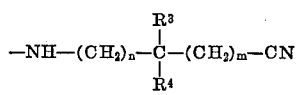

wherein $n$ and $m$ are zero or 1 with the provision that only one of $n$ and $m$ may be zero; $R^3$ and $R^4$ are the same or different and are straight-chain or branched-chain alkyl having from 1 to 4 carbon atoms and wherein either $R^3$ or $R^4$ may also be hydrogen; and $R_2$ is

wherein $R^5$ is hydrogen or straight-chain or branched-chain lower alkyl.

The compounds are useful as plant growth modifiers and are distinguished by a high selectivity and a rapid decomposition in the ground.

---

CROSS REFERENCE TO RELATED APPLICATIONS

This application is a continuation-in-part of application Ser. No. 652,036, now abandoned, filed by the same inventor on July 10, 1967 for "Novel Cyanoalkylamino Substituted Triazines Having Plant Growth Regulating Action," now abandoned.

BACKGROUND OF THE INVENTION

The invention relates to substituted s-triazine compounds and their use as growth modifiers for plants and in particular as herbicides.

s-Triazine compositions are known which in the 2-position either have an azido- or an alkylmercapto-group or a halogen atom and which in the 4-position are substituted by a cyanoalkylamino group which is attached to a primary carbon atom. These compositions as disclosed in Belgian Pat. 656,233 and 644,355 do not have any noteworthy herbicidal properties.

In Pat. 2,476,547, triazine compounds have also been disclosed which contain cyanoalkylamino groups of specific configurations. An example, for instance, is the compound 2-chloro - 4 - amino - 6 - cyanomethyl-amino-s-triazine.

These compositions are in use as fungicides and insecticides. However, their herbicidal action is so minor that they can destroy leaf fungus without damaging the plant itself.

It is therefore an object of the present invention to provide for compounds which can be used for modifying plant growth, and in particular as herbicides and which are distinguished both by a high selectivity and by a rapid decomposition in the ground.

SUMMARY OF THE INVENTION

This object is met by a substituted s-triazine of the formula:

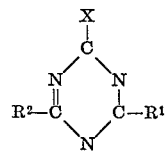

wherein X is halogen, alkoxy, or alkylmercapto, alkyl in alkoxy and alkylmercapto having 1 to 6 carbon atoms; $R^1$ is

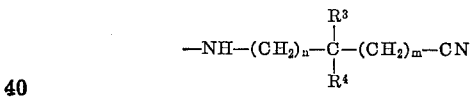

wherein $n$ and $m$ are zero or 1 with the provision that only one of $n$ and $m$ may be zero; $R^3$ and $R^4$ are the same or different and are straight-chain or branched-chain alkyl having from 1 to 4 carbon atoms and wherein either $R^3$ or $R^4$ may also be hydrogen; and $R^2$ is

wherein $R^5$ is hydrogen or straight-chain or branched-chain lower alkyl.

DESCRIPTION OF THE PREFERRED EMBODIMENTS

The term "lower" in connection with alkyl groups or the alkyl portion of other groups as used in the above summary of the invention and as used in the following description and the claims is to be understood to refer to groups having 1 to 6 carbon atoms. Preferably, the groups have 1 to 4 carbon atoms.

If X in the above-given formula is halogen it is preferably chlorine. A further preference for X is a lower alkoxy or alkylmercapto group.

If $R^1$ and $R^2$ are substituted alkyl or alkenyl groups, the substituents may be the following groups: —OH, —OR, —SR— or —CN. R in these groups is again a lower alkyl group.

Starting materials

The starting materials for synthesizing the compounds of the invention are branched or substituted amines which can be made by methods described in the literature.

For instance, an amine of the general formula

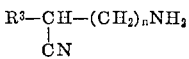

can be made from α-alkylated acrylonitriles by reaction with concentrated aqueous ammonia in an autoclave at temperatures between 140 and 150° C. Specific examples of such compounds are the following:

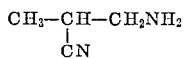

colorless liquid, B.P.$_{12}$ 70-71° C.

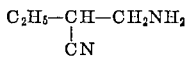

colorless liquid, B.P.$_{12}$ 81-82° C.

For instance, if allylcyanide is reacted with concentrated ammonia (40%) in an autoclave for a period of 2 hours, 3-amino-butyronitrile is obtained of the following formula:

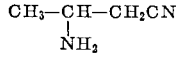

colorless liquid, B.P.$_{12}$ 68-69° C.

In general, compounds of the following formula

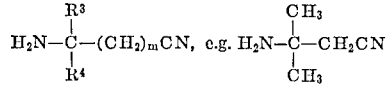

(colorless liquid B.P.$_{12}$ 66-68° C.)
are obtained likewise by reacting 2,2-dialkylated acrylonitrile with ammonia. The necessary acrylonitriles can be formed by Knoevenagel-condensation of ketones with cyanoacetic acid and subsequent decarboxylation.

Compounds of the type

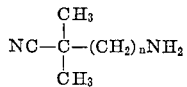

are for instance obtainable as follows

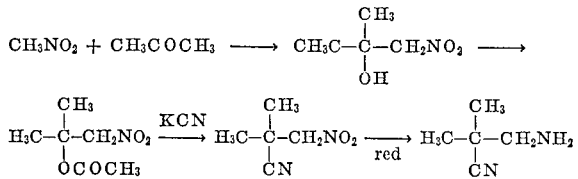

Process of making the compounds

The compounds of the invention can for instance be made as follows: 1 mole of cyanuric chloride may for instance be reacted with 1 mole of an aminonitrile in the presence of 1 mole of a hydrogen halide binding agent such as sodium hydroxide, and this may then be followed by reaction with 1 mole of ammonia or an amine of the general formula NHR$^1$R$^2$ likewise in the presence of 1 mole of sodium hydroxide. It is also possible first to introduce the amine of the formula NHR$^1$R$^2$ and subsequently to react with the aminonitrile.

The thus-obtained 2-chloro-cyanoalkylamino-6-(alkyl)-aminotriazines can then be converted to the corresponding alkylmercapto compounds by reaction with alkylmercaptans in the presence of an acid receptor. The corresponding alkoxy compounds, on the other hand, can be formed by reacting the halogeno triazines with a sodium alcoholate.

Utility

The compounds of the invention are effective plant growth modifiers and, in particular, herbicides and are distinguished by a high selectivity and a rapid decomposition in the ground. The compounds may be used in view of their superior herbicidal properties both before and after germination. They will affect the plant growth even in very small concentrations. Depending on the type of $R^1$ to $R^4$ substituents, they can be used for destroying or selectively suppressing weeds from an environment of cultivated plants, or they may serve to completely destroy or prevent undesirable plant growth.

The compounds of the invention can also be used for defoliation, for reduction of the fruition, delayed blossoming, etc. They can be used singly or in a mixture of different compounds of the invention or in a mixture with other type herbicides. They can also be used in admixture with insecticides, fungicides and fertilizers.

It was surprising that the compounds of the invention had such strong herbicidal action and such high selectivity in spite of the fact that they had only a comparatively small survival time in the ground amounting only to a few months, which is particularly important in case of rotating crops.

As already indicated, the compounds of the invention, depending on the substituents present, have excellent pre-emergence or postemergence activity or an activity of both types together. In most cases, they are crystalline compounds and have a high solubility in many organic solvents. This distinguishes the compounds from many prior-art chloro-bis-alkylaminotriazines which have only slight solubility in customary solvents. The compounds of the invention can therefore be used very well for spraying by airplanes in the form of solutions.

Suitable solvents are for instance the following: alcohols, ketones, hydrocarbons, halogenated hydrocarbons such as chloronaphthalene, mineral oils such as diesel fuel, vegetable oils or mixtures of these several materials.

The compounds of the invention can also be used on solid carrier materials. Examples of such carrier materials are clay, kaolin, diatomaceous earth, bentonite, talcum, finely ground calcium carbonate, charcoal, sawdust, etc.

The effective agents can be mixed in dry form with the carrier materials. However, they can also be applied to the carrier materials as solutions or emulsions or can be mixed with the carrier materials in this form subsequent to drying of the mixture.

In order to improve the adherence of the effective agents on the carrier materials, conventional adhesives may be used such as glue, casein, aliginic acid and similar materials.

It is finally also possible to mix the compounds of the invention, if desired together with carrier materials, with emulsifying agents and stabilizers, for instance to form a paste or a powder which then may be set up with water to form a suspension.

Suitable cross-linking agents, emulsifiers and stabilizers are anionic, cationic or non-ionic materials of the conventional types such as Turkey red oil, fatty acid salts, alkylarylsulfonates, secondary alkylsulfates, resin acid salts, polyethylene ethers of fatty alcohols, fatty acids or fatty amines, quarternary ammonium compounds, ligninsulfone acid, saponin, gelatin, casein. These additives may be used singly or in mixture of different additives.

Specific examples and tests

Examples for the compounds of the invention are listed in the following Table I. All of the compounds comply with the general formula:

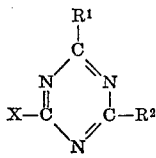

TABLE I

| X | R₁ | R₂ | Color and form | M.P. (° C.) |
|---|---|---|---|---|
| Cl | NH—CH₂—CH(CH₃)—CN | NH₂ | White crystals | 228–229 |
| Cl | Same as above | NHCH₃ | ....do.... | 250–251 |
| Cl | ....do.... | NHC₂H₅ | ....do.... | 219–220 |
| Cl | ....do.... | NHC₃H₇-i | ....do.... | 137–138 |
| Cl | NH—CH₂—CH(C₂H₅)—CN | NH₂ | ....do.... | 201–202 |
| Cl | Same as above | NHCH₃ | ....do.... | 208–209 |
| Cl | ....do.... | NHC₂H₅ | ....do.... | 188–189 |
| Cl | ....do.... | NHC₃H₇-i | ....do.... | 88–89 |
| Cl | NH—CH(CH₃)—CH₂—CN | NHC₂H₅ | ....do.... | 141–143 |
| Cl | Same as above | NHC₃H₇-i | ....do.... | 183–184 |
| Cl | NH—C(CH₃)₂—CH₂—CN | NHC₂H₅ | ....do.... | 125–127 |
| Cl | Same as above | NHC₃H₇-i | ....do.... | 168–169 |
| Cl | ....do.... | NHCH₃ | ....do.... | 155–157 |
| Cl | NH—CH₂—C(CH₃)₂—CN | NHC₂H₅ | ....do.... | 168–169 |
| SCH₃ | NH—CH₂—CH(CH₃)—CN | NHC₂H₅ | Light yellow crystals | 110–111 |
| SCH₃ | Same as above | NHC₃H₇-i | ....do.... | Oil |
| OCH₃ | ....do.... | NH₂ | White crystals | F. 159.5–160.5 |
| OCH₃ | ....do.... | NHCH₃ | ....do.... | F. 106 |
| OCH₃ | ....do.... | NHC₃H₇-i | ....do.... | Oil |
| SCH₃ | NH—CH(CH₃)—CH₂—CN | NHC₂H₅ | ....do.... | Oil |
| OCH₃ | Same as above | NHC₂H₅ | ....do.... | 89–90 |
| SCH₃ | NH—C(CH₃)₂—CH₂—CN | NHC₂H₅ | Light yellow crystals | 113 |
| OCH₃ | Same as above | NHC₂H₅ | White crystals | 156 |

More specific examples including the process of making are the following:

Example 1

10 parts of 2-ethylamino-4-(2-cyano-propyl)-amino-6-chloro-triazine, 89 parts bentonite and 1 part of a highly dispersed pyrogenically formed silicic acid were ground in a ball mill to a fine dust. This mixture could then be used as a dusting powder.

Example 2

A mixture of 2 - isopropylamino-4-(1,1-dimethyl-2-cyanoethyl)-amino-6-methoxy-s-triazine and 90 parts of diatomaceous earth were ground to extreme fineness as in a ball mill. They were then useful as a dusting composition.

Example 3

A mixture of 2 - isopropylamino-4-(1,1-dimethyl-2-cyano-ethyl)-amino-6-methylmercapto-s-triazine, 70 parts of xylene and 10 parts of octylphenylpolyglycolethers from di-t-butylphenol and 10–12 moles ethylenexodie (= "Hostapal CV") was formed, to which water was then added to prepare a stable emulsion.

Example 4

25 parts of 2-isopropylamino-4-(1-methyl-2-cyano-ethyl)-amino-6-chlorotriazine were dissolved in 200 parts of cyclohexanone, 15 parts of xylene and 10 parts of a substituted naphthalinedisulfonic acid ("Nekal BX"). After addition of water, the mixture resulted in a stable emulsion.

Example 5

50 parts of 2-ethylamino-4-(2-cyano-propyl)-amino-6-methoxy-s-triazine were dissolved in 450 parts of kerosene. The solution could immediately be used for spraying.

Example 6

67 g. of methacrylonitrile and 200 ml. of concentrated ammonia (23%) were introduced in a 1 liter autoclave. There was further introduced 200 g. of ammonia gas and the mass was then rapidly heated to 150° C. After 2 hours, it was gradually cooled down, the pressure was released and the homogeneous aqueous solution was saturated with potassium hydroxide. The amine was separated out, dried with potassium hydroxide and subsequently distilled in a vacuum. 1-methyl-2-aminopropionitrile distilled at B.P.$_{12}$ 70–71° C. as a colorless liquid. The yield was 61.5 g. corresponding to 73.2% of the theoretical yield.

Example 7

A mixture of 67 g. of allylcyanide and 250 g. of an aqueous ammonia solution (40%) was heated in an autoclave for 3 hours to 140–150° C. upon shaking. After cooling, the aqueous solution was saturated with potassium hydroxide, the precipitated amine was separated, dried with potassium hydroxide and distilled in a vacuum. 3-amino-butyronitrile distilled at B.P.$_{12}$ 68–69° C. as a colorless liquid. The yield was 64.7 g., corresponding to 77% of the theoretical yield.

Example 8

1-cyano-2-methyl-crotonic acid was decarboxylated by a heat treatment to 2,2-dimethyl-acrylonitrile. The crotonic acid had been obtained by Knoevenagel-condensation from cyanoacetic acid and acetone.

81 g. of the nitrile were then heated together with 250 g. of a 50% aqueous ammonia solution for 3 hours in an autoclave to a temperature between 140 and 150° C. Subsequently, the mass was cooled, then saturated with potassium hydroxide, and the formed amine was separated. The amine was dried with potassium hydroxide and distilled in a vacuum. 64.8 g. of 2-amino-2,2-dimethyl-propionitrile distilled at B.P.$_{12}$ 66–68° C. as a colorless liquid which corresponded to 66.3% of the theoretical yield.

Example 9

184.5 g. of cyanuric chloride were suspended in 600 ml. acetone, then cooled to 0° C. 200 g. of ice was added. Thereafter, 84 g. of 1-methyl-2-amino-propionitrile were added dropwise at 0–2° C. and subsequently a solution of 40 g. NaOH was added in 200 ml. H$_2$O. 2 mole of a 50% ethylamine solution (180 g.) were then added dropwise at a temperature up to 40° C. The acetone was removed in a vacuum as soon as the solution had a neutral reaction (after about 1 hour) and the solution was then diluted with water. The white crystals were removed by suction, washed and dried at 50° C. in a vacuum. The thus-obtained 2-ethylamino-4-(2-cyano-propyl)-amino-6-chloro-s-triazine had a melting point between 219 and 220° C. The yield was 238 g. which was equivalent to 99% of the theoretical yield.

Example 10

24.05 of the chlorotriazine (1/10 mole) which was obtained in Example 9 was subjected to boiling for 8 hours with a solution of 6.6 g. of sodium methylmercaptide in 200 ml. methanol. The solution subsequently was concentrated to dryness by evaporation and the residue was taken up with water. The crystalline product was removed by suction and dried. There were obtained light-yellow crystals of 2-ethylamino-4-(2-cyano-propyl)amino-6-methylmercapto-s-triazine with a melting point between 110 and 111° C. The yield was 22.5 g. corresponding to 85.2% of the theoretical yield.

Example 11

22.65 g. of 2-methylamino-4-(2-cyano-propyl)-amino-6-chloro-s-triazine (1/10 mole) were boiled for 6 hours with a solution of 5.4 g. of sodiummethylate in 150 ml. methanol. The mixture then had a neutral reaction. It was evaporated to 1/3 of its initial volume, whereupon it was poured into water. The precipitated highly viscous materials resulted in rapid crystallization. After separation and drying, there were obtained 19.9 g. of 2-methyl-amino-4-(2-cyano-propyl)amino-6-methoxy-s-triazine in the form of white crystals, that is 89.8% of the theoretical yield, having a melting point of 106° C.

Example 12

55.35 g. of cyanuric chloride were suspended in 300 ml. acetone, cooled to 0° C. and, at this temperature, 25.7 g. of 3-amino-butyronitrile were added upon stirring. A solution of 12 g. NaOH in 60 ml. water was subsequently added. Thereafter, 25.5 g. of a 70% isopropylamine solution was added dropwise and finally another solution of 12 g. of NaOH in 60 ml. H$_2$O were added at a temperature rising up to 45° C. As soon as the mixture had a neutral reaction, the acetone was removed in a vacuum, and the residue taken up with water. The white crystals were removed by suction, washed and dried. The formed 2-isopropyl-amino-4-(1-methyl-2-cyano-ethyl)-amino-chloro-s-triazine has a melting point between 183 and 184° C. The yield was 75 g. corresponding to 98% of the theoretical yield.

Example 13

184.5 g. of cyanuric chloride were suspended in 600 ml. acetone. The mixture was cooled to 0° C. Thereafter, 99 g. of 2,2-dimethyl-2-amino-propionitrile were added dropwise at this temperature and subsequently 200 ml. of a 5-normal sodium hydroxide solution were added. The mixture soon had a neutral reaction. At a temperature rising to 40° C. 90 g. of a 50% ethylamine solution and 200 ml. of 5 N sodium hydroxide solution were added. The neutral solution was diluted with 2 liters of water and the crystals were removed by suction. After drying, there were obtained 238.5 g. of 27. The yield was 93.75 of the theoretical yield. The melting point was between 125 and 127° C.

Example 14

A solution of 18.45 g. of cyanuric chloride in 120 ml. tetrahydrofuran was treated at 0° C., first with 9.9 g. 1,1-dimethyl-2-aminopropionitrile and, secondly, with 20 ml. 5 N sodium hydroxide solution. As soon as the solution had a neutral reaction, 9 g. of a 50% ethylamine solution were added at a temperature up to 40° C. and finally 20 ml. 5 N NaOH were also added. There were obtained 22.9 g. of 2-ethylamino-4-(2,2-dimethyl-2-cyano-ethyl)-amino-6-chloro-s-triazine which corresponded to 89.7% of the theoretical yield, in the form of white crystals with a melting point between 168 and 169° C.

Example 15

Tests

In order to test the herbicidal action of the compounds of the invention, the following experiments were carried out:

(A) Application to the ground after seeding:

Various seeds were embedded by raking into the earth which was contained in plastic bowls. The test was carried out in a hothouse at a temperature of 21° C. The earth was watered in the morning and in the afternoon and was then treated with a dispersion which was obtained by pouring a solution of the herbicide into equal parts of water. Then normal watering was continued, and the germinating of the plants was checked. Two weeks after seeding, it was determined whether and to what extent the plant growth had been suppressed.

(B) Application to the ground after germination:

Various seeds were again placed into the earth by raking in a hothouse having an interior temperature of 21° C. After germinating, the aqueous dispersion mentioned at A of the effective agent of the invention was applied to the ground. After two weeks it was determined whether and to what extent the growth had been diminished.

(C) The same process was followed as at B but with the distinction that the aqueous dispersion of the effective agent was not applied to the ground but to the leaves.

The results of the tests will be found in the following Table II. The evaluation of the growth was carried out on a scale on which zero indicated normal growth and 9 total destriction of the plant.

The concentration of the effective agent in the different test series was as follows:

(A) 20 kg./ha. and 1 kg./ha.
(B) 10 kg./ha., 1 kg./ha., 0.1 kg./ha.
(C) 10 kg./ha., 1 kg./ha., 0.1 kg./ha.

"ha" in these statements refers to one hectare equalling 2.471 acres. The effective agents of the invention used in these tests were the following, see formula given before Table I:

TABLE II

| Compound number | Substituents | | |
|---|---|---|---|
| | X | $R_2$ | $R_1$ |
| I | Cl | $NHC_2H_5$ | $\begin{array}{c}CH_3\\|\\NH-CH-CH_2CN\end{array}$ |
| II | Cl | $NHC_3H_7\text{-}i$ | $\begin{array}{c}CH_3\\|\\NH-CH-CH_2CN\end{array}$ |
| III | Cl | $NHC_2H_5$ | $\begin{array}{c}CH_3\\|\\NH-C-CH_2CN\\|\\CH_3\end{array}$ |
| IV | $OCH_3$ | $NHC_2H_5$ | $\begin{array}{c}CH_3\\|\\NH-CH_2-CH-CN\end{array}$ |
| V | $OCH_3$ | $NHC_2H_5$ | $\begin{array}{c}C_2H_5\\|\\NH-CH_2-CH-CN\end{array}$ |
| VI | $OCH_3$ | $NH-CH_3$ | $\begin{array}{c}C_2H_5\\|\\NH-CH_2-CH-CN\end{array}$ |
| VII | $SCH_3$ | $NHC_2H_5$ | $\begin{array}{c}CH_3\\|\\NH-CH-CH_2-CN\end{array}$ |
| VIII | $SCH_3$ | $NHC_2H_5$ | $\begin{array}{c}C_2H_5\\|\\NH-CH_2-CH-CN\end{array}$ |

TEST SERIES A

| Compound number | kg./ha. | Corn | Oats | Rye-grass | Peas | Lin-seed | Mus-tard | Sugar beets |
|---|---|---|---|---|---|---|---|---|
| I | 20 | 0 | 6 | 8 | 3 | 9 | 9 | 9 |
| | 1 | 0 | 4 | 7 | 1 | 8 | 5 | 8 |
| II | 20 | 0 | 7 | 8 | 4 | 9 | 9 | 9 |
| | 1 | 0 | 3 | 6 | 2 | 8 | 6 | 7 |
| III | 20 | 0 | 7 | 9 | 4 | 9 | 9 | 9 |
| | 1 | 0 | 3 | 8 | 1 | 8 | 5 | 9 |
| IV | 20 | 7 | 9 | 9 | 8 | 9 | 9 | 9 |
| | 1 | 2 | 7 | 6 | 3 | 8 | 9 | 9 |
| V | 20 | 2 | 6 | 7 | 4 | 9 | 9 | 9 |
| | 1 | 2 | 3 | 3 | 0 | 8 | 7 | 9 |
| VI | 20 | 5 | 7 | 3 | 9 | 9 | 9 | 9 |
| | 1 | 4 | 4 | 0 | 7 | 7 | 4 | 7 |
| VII | 20 | 3 | 7 | 8 | 3 | 9 | 9 | 9 |
| | 1 | 1 | 4 | 6 | 0 | 9 | 4 | 9 |
| VIII | 20 | 3 | 5 | 8 | 2 | 9 | 9 | 9 |
| | 1 | 1 | 1 | 3 | 1 | 9 | 2 | 8 |

TEST SERIES B

| Compound number | kg./ha. | Corn | Oats | Rye-grass | Peas | Lin-seed | Mus-tard | Sugar beets |
|---|---|---|---|---|---|---|---|---|
| I | 10 | 0 | 6 | 8 | 5 | 9 | 9 | 9 |
| | 1 | 0 | 3 | 5 | 1 | 9 | 8 | 9 |
| | 0.1 | 0 | 1 | 1 | 0 | 8 | 1 | 7 |
| II | 10 | 0 | 6 | 6 | 8 | 9 | 9 | 9 |
| | 1 | 0 | 3 | 6 | 1 | 8 | 7 | 9 |
| | 0.1 | 0 | 3 | 3 | 0 | 8 | 6 | 7 |
| III | 10 | 0 | 8 | 8 | 6 | 9 | 9 | 9 |
| | 1 | 0 | 6 | 7 | 3 | 9 | 9 | 9 |
| | 0.1 | 0 | 3 | 2 | 0 | 8 | 6 | 8 |
| IV | 10 | 6 | 9 | 9 | 8 | 9 | 9 | 9 |
| | 1 | 1 | 7 | 5 | 5 | 8 | 9 | 9 |
| | 0.1 | 0 | 1 | 1 | 2 | 2 | 2 | 5 |

TEST SERIES B.—Continued

| Compound number | kg./ha. | Corn | Oats | Rye-grass | Peas | Lin-seed | Mus-tard | Sugar beets |
|---|---|---|---|---|---|---|---|---|
| V | 10 | 3 | 7 | 7 | 3 | 9 | 9 | 9 |
| | 1 | 2 | 6 | 6 | 1 | 9 | 8 | 9 |
| | 0.1 | 0 | 1 | 2 | 0 | 4 | 6 | 7 |
| VI | 10 | 3 | 6 | 6 | 3 | 9 | 9 | 9 |
| | 1 | 2 | 5 | 5 | 2 | 6 | 8 | 9 |
| | 0.1 | 0 | 1 | 3 | 1 | 5 | 7 | 7 |
| VII | 10 | 7 | 8 | 9 | 7 | 9 | 9 | 9 |
| | 1 | 3 | 7 | 8 | 5 | 9 | 9 | 9 |
| | 0.1 | 0 | 4 | 1 | 1 | 9 | 9 | 7 |
| VIII | 10 | 5 | 8 | 9 | 7 | 9 | 9 | 9 |
| | 1 | 2 | 6 | 8 | 6 | 9 | 9 | 9 |
| | 0.1 | 0 | 6 | 5 | 2 | 9 | 9 | 9 |

TEST SERIES C

| Compound number | kg./ha. | Corn | Oats | Rye-grass | Peas | Lin-seed | Mus-tard | Sugar beets |
|---|---|---|---|---|---|---|---|---|
| I | 10 | 0 | 6 | 8 | 2 | 9 | 9 | 9 |
| | 1 | 0 | 5 | 6 | 0 | 9 | 9 | 9 |
| | 0.1 | 0 | 4 | 2 | 0 | 8 | 5 | 7 |
| II | 10 | 0 | 7 | 8 | 1 | 9 | 9 | 9 |
| | 1 | 0 | 5 | 6 | 0 | 7 | 9 | 8 |
| | 0.1 | 0 | 4 | 3 | 0 | 7 | 7 | 6 |
| III | 10 | 1 | 6 | 7 | 2 | 9 | 9 | 9 |
| | 1 | 0 | 5 | 7 | 0 | 9 | 9 | 9 |
| | 0.1 | 0 | 4 | 2 | 0 | 9 | 4 | 4 |
| IV | 10 | 7 | 8 | 9 | 5 | 9 | 9 | 9 |
| | 1 | 4 | 5 | 6 | 0 | 8 | 8 | 9 |
| | 0.1 | 0 | 0 | 0 | 0 | 0 | 1 | 3 |
| V | 10 | 5 | 7 | 8 | 0 | 9 | 9 | 9 |
| | 1 | 3 | 6 | 7 | 0 | 8 | 9 | 8 |
| | 0.1 | 0 | 1 | 2 | 0 | 0 | 3 | 0 |
| VI | 10 | 3 | 7 | 8 | 0 | 9 | 9 | 8 |
| | 1 | 1 | 6 | 6 | 0 | 9 | 9 | 7 |
| | 0.1 | 0 | 1 | 1 | 0 | 6 | 5 | 6 |
| VII | 10 | 5 | 6 | 8 | 1 | 9 | 9 | 9 |
| | 1 | 2 | 5 | 6 | 0 | 8 | 8 | 8 |
| | 0.1 | 0 | 1 | 1 | 0 | 3 | 2 | 0 |
| VIII | 10 | 5 | 6 | 7 | 0 | 8 | 8 | 8 |
| | 1 | 1 | 5 | 6 | 0 | 7 | 8 | 8 |
| | 0.1 | 0 | 2 | 1 | 0 | 2 | 2 | 4 |

I claim:
1. A substituted s-triazine of the formula

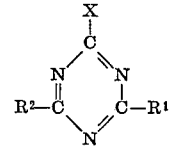

wherein X is halogen, alkoxy or alkylmercapto, alkyl in alkoxy and alkylmercapto having 1 to 6 carbon atoms; $R^1$ is

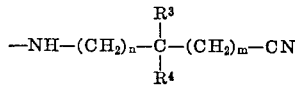

wherein $n$ and $m$ are zero or 1 with the provision that only one of $n$ and $m$ may be zero; $R^3$ and $R^4$ are the same or different and are straight-chain or branched-chain alkyl having from 1 to 4 carbon atoms and wherein either $R^3$ or $R^4$ may also be hydrogen; and $R^2$ is

wherein $R^5$ is hydrogen or straight-chain or branched-chain lower alkyl.

2. A compound as in claim 1, wherein X is chlorine.
3. The compound as in claim 1, wherein X is lower alkoxy or lower alkylmercapto.
4. The compound of claim 1, in which X is Cl and in which $R^1$ is

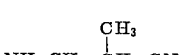

and $R^2$ is $NH_2$.

5. The compound of claim 1, in which X is Cl and in which $R^1$ is

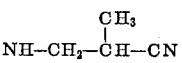

and $R^2$ is $NHCH_3$.

6. The compound of claim 1, in which X is Cl and in which R¹ is

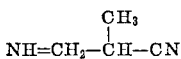

and R² is NHC₂H₅.

7. The compound of claim 1, in which X is Cl and in which R¹ is

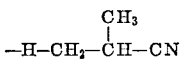

and R² is NHC₃H₇-i.

8. The compound of claim 1, in which X is Cl and in which R¹ is

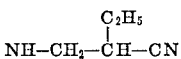

and R² is NH₂.

9. The compound of claim 1, in which X is Cl and in which R¹ is

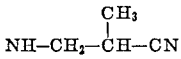

and R² is NHCH₃.

10. The compound of claim 1, in which X is Cl and in which R¹ is

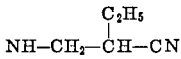

and R² is NHC₂H₅.

11. The compound of claim 1, in which X is Cl and in which R¹ is

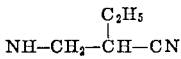

and R² is NHC₃H₇-i.

12. The compound of claim 1, in which X is Cl and in which R¹ is

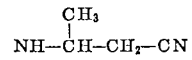

and R² is NHC₂H₅.

13. The compound of claim 1, in which X is Cl and in which R¹ is

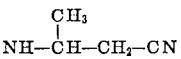

and R² is NHC₃H₇-i.

14. The compound of claim 1, in which X is Cl and in which R¹ is

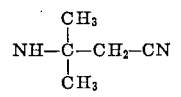

and R² is NHC₂H₅.

15. The compound of claim 1, in which X is Cl and in which R¹ is

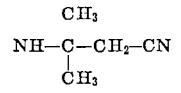

and R² is NHC₃H₇-i.

16. The compound of claim 1, in which X is Cl and in which R¹ is

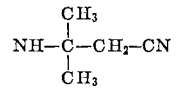

and R² is NHCH₃.

17. The compound of claim 1, in which X is Cl and in which R¹ is

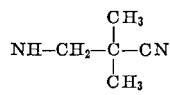

and R² is NHC₂H₅.

18. The compound of claim 1, in which X is SCH₃ and in which R¹ is

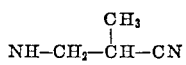

and R² is NHC₂H₅.

19. The compound of claim 1, in which X is SCH₃ and in which R¹ is

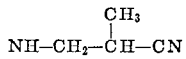

and R² is NHC₃H₇-i.

20. The compound of claim 1, in which X is OCH₃ and in which R¹ is

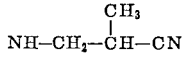

and R² is NH₂.

21. The compound of claim 1, in which X is OCH₃ and in which R¹ is

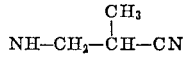

and R² is NHCH₃.

22. The compound of claim 1, in which X is OCH₃ and in which R¹ is

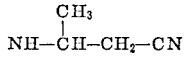

and R² is NHC₂H₇-i.

23. The compound of claim 1, in which X is SCH₃ and in which R¹ is

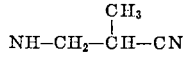

and R² is NHC₂H₅.

24. The compound of claim 1, in which X is OCH₃ and in which R¹ is

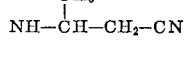

and R² is NHC₂H₅.

25. The compound of claim 1, in which X is SCH₃ and in which R¹ is

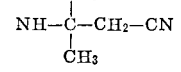

and R² is NHC₂H₅.

26. The compound of claim 1, in which X is OCH₃ and in which R¹ is

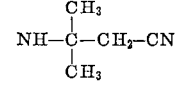

and R² is NHC₂H₅.

References Cited

UNITED STATES PATENTS

| | | | |
|---|---|---|---|
| 3,255,191 | 6/1966 | Dexter et al. | 260—249.8 X |
| 3,305,551 | 2/1967 | Picklesimer et al. | 260—249.8 X |
| 3,326,913 | 6/1967 | Schulz et al. | 260—249.6 |
| 3,415,827 | 12/1968 | Nikles et al. | 260—249.8 |

JOHN M. FORD, Primary Examiner

U.S. Cl. X.R.

71—93; 260—249.6, 465.1, 465.5 R, 638 N